(12) United States Patent
Stavarache et al.

(10) Patent No.: US 11,868,930 B2
(45) Date of Patent: Jan. 9, 2024

(54) EVALUATING ORGANIZATIONAL SKILLS USING COGNITIVE COMPUTING TO DETERMINE COST OF ENTERING A NEW MARKET

(71) Applicant: International Business Machines Corporation, Armonk, NY (US)

(72) Inventors: Lucia Larise Stavarache, Columbus, OH (US); Sandeep Sukhija, Rajasthan (IN); Grigorij Kaplan, Vilnius (LT); Stan Kevin Daley, Espanola, NM (US); Harish Bharti, Pune (IN); Jurgis Mikucionis, Vilnius (LT)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 17/568,363

(22) Filed: Jan. 4, 2022

(65) Prior Publication Data
US 2023/0214736 A1     Jul. 6, 2023

(51) Int. Cl.
G06Q 10/06 (2023.01)
G06Q 10/0631 (2023.01)
G06Q 10/0637 (2023.01)

(52) U.S. Cl.
CPC ............... *G06Q 10/063112* (2013.01); *G06Q 10/06315* (2013.01); *G06Q 10/06375* (2013.01)

(58) Field of Classification Search
None
See application file for complete search history.

(56) References Cited

U.S. PATENT DOCUMENTS 3,214,236 A1   7/2012   Dunagan et al.
9,292,821 B2   3/2016   Arsanjani et al.
(Continued)

FOREIGN PATENT DOCUMENTS

WO   2020003325 A1   1/2020

OTHER PUBLICATIONS

Jantan, et al.,"Classification Techniques for Talent Forecasting in Human Resource Management", R. Huang et al. (Eds.): ADMA 2009, LNAI 5678, 2009, pp. 496-503, © Springer-Verlag Berlin Heidelberg 2009.
(Continued)

*Primary Examiner* — Arif Ullah
(74) *Attorney, Agent, or Firm* — Scully, Scott, Murphy & Presser, PC; Michael A. Petrocelli, Esq.

(57) ABSTRACT

Generating a model for evaluating organizational skills to determine cost of entering a new market includes training a machine learning model to define business capabilities, processes and required skills of an organization based on a current business strategy, training the machine learning model to define a plurality of skill classes of the required skills of the organization using the cognitive computing processor device, training the machine learning model to define skill profiles of the available talent of the organization based on the plurality of skill classes, determining skill gaps of the available talent of the organization by analyzing the required skills of the organization and the skill profiles, assessing skills required for a new business strategy for the organization, and determining a cost of the organization executing the new business strategy based on the skill profiles, the at least one skill gap and the new business strategy skills.

16 Claims, 6 Drawing Sheets

(56) References Cited

U.S. PATENT DOCUMENTS

| | | | |
|---|---|---|---|
| 11,068,826 | B2 | 7/2021 | Rajan |
| 11,450,225 | B1* | 9/2022 | Kilari ................. G09B 7/04 |
| 2005/0246215 | A1* | 11/2005 | Rackham .............. G06Q 10/063 |
| | | | 705/7.11 |
| 2007/0021993 | A1 | 1/2007 | Chandra et al. |
| 2007/0033211 | A1 | 2/2007 | Berman et al. |
| 2007/0038501 | A1 | 2/2007 | Lee et al. |
| 2007/0279416 | A1 | 12/2007 | Cobb et al. |
| 2018/0268373 | A1* | 9/2018 | Bheemavarapu .. G06Q 10/1053 |
| 2018/0365229 | A1* | 12/2018 | Buhrmann ............. G06N 5/022 |
| 2021/0044697 | A1* | 2/2021 | Khafizov .............. G06F 18/285 |

OTHER PUBLICATIONS

Bolisani, et al., "Knowledge strategy planning: an integrated approach to manage uncertainty, turbulence, and dynamics", Journal of Knowledge Management, 2017, pp. 233-253, vol. 21, No. 2, Emerald Publishing Limited.

Disclosed Anonymously, "Cognitive Adaptations for the Analysis and Prediction of Current and Future Skills Needed Per Job Role Description", ip.com, Apr. 17, 2020, pp. 1-5.

Eitbok, "Enterprise It Skill Frameworks", IEEE, Association for Computing Machinery, Dec. 23, 2017, pp. 1-13.

Yasodha, et al., "Data Mining Classification Technique for Talent Management using SVM", 2012 International Conference on Computing, Electronics and Electrical Technologies [ICCEET], Mar. 21, 2012, pp. 1-5.

Jantan, et al., "Knowledge Discovery Techniques for Talent Forecasting in Human Resource Application", World Academy of Science, Engineering and Technology, 50, 2009, pp. 1-9, vol. 3, No. 2.

Jantan, et al., "Human Talent Prediction in HRM using C4.5 Classification Algorithm", (IJCSE) International Journal on Computer Science and Engineering, 2010, pp. 2526-2534, vol. 02, No. 08,.

Kiavola, Anni, "Current and Future Trends in Data Driven Talent Identification in Mncs", Master's Thesis, VAASA 2018, pp. 1-78.

Ke, et al., "The Application of Markov Model in the Enterprise Personnel Planning", IEEE, Jan. 8, 2011, pp. 257-260.

Su, Jennifer, "Systems and Methods for Automatic Institution Skills Optimization", ip.com, Oct. 30, 2017, pp. 1-13.

\* cited by examiner

EVALUATING ORGANIZATIONAL SKILLS USING COGNITIVE COMPUTING TO DETERMINE COST OF ENTERING A NEW MARKET

BACKGROUND

This disclosure is directed to computing methods and systems and more particularly, to various embodiments for evaluating organizational skills using cognitive computing to determine cost of entering a new market.

In large corporate environments, human resources departments, available resource planning, recruiting and business necessity are often disconnected and not-balanced to keep up with business emerging strategies. Companies often want to switch gears to a new strategic area but there must be a determination made as to whether the company has the skills and no manpower to execute it. In a very competitive market, and even more in uncertain times as COVID-19, all companies have to quickly adapt to the market by best positioning their messaging, resources and products to remain competitive, by opening new revenue streams.

For example, a company hit by a massively unexpected downturn in business may have a pool of personnel available, however, if the company does not have the ability to project their available skills on new businesses and open new revenue streams, the company may be forced to lay off or reduce people to meet their cost targets.

Companies lack the ability from a business strategy perspective analyze new business areas openings or division closures that will results in a percentage of company resources that will need redeployment. These dealignments make it difficult for companies people to keep track or properly project, for new/existing individuals, their fitness to the company, their relevance towards the strategy and their skill value to company.

Each business plans their strategy and needs to align their work fleet to execute it through reskill, up-skill or new hire, incurring a cost on each step and often the cost of the execution is more than benefit itself. As time passes the business may be forced to close if the necessary resource skill alignment was not executed efficiently and timely.

The prior art recruiting and human resources platforms focus on hiring for the job without any holistic business view on other jobs in the company a candidate could fit, and what will happen in case that business part will become deprecated, outsourced or vision and direction are switched, given there will be a pull of resources engaged that will need to be covered.

SUMMARY

One embodiment of a computer implemented method for generating a model for evaluating organizational skills to determine cost of entering a new market, using cognitive computing, by a processor device, includes the steps of: training a machine learning model to define business capabilities, processes and required skills of an organization based on a current business strategy using a cognitive computing processor device; training the machine learning model to define a plurality of skill classes of the required skills of the organization using the cognitive computing processor device; training the machine learning model to define skill profiles of the available talent of the organization based on the plurality of skill classes using the cognitive computing processor device; determining, using the trained machine learning model, at least one skill gap of the available talent of the organization by analyzing the required skills of the organization and the skill profiles, using the cognitive computing processor device; assessing skills required for a new business strategy for the organization, using the cognitive computing processor device; and determining a cost of the organization executing the new business strategy based on the skill profiles, the at least one skill gap and the new business strategy skills, using the cognitive computing processor device.

A computer system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment, this disclosure is directed to an intelligent computer system that allows the business to obtain an overview its individual resource business fitness, simulate future business areas and align resource competency, including skill and skill level, with human resource recruitment guidance. Some embodiments utilize a Component Business Model (CBM) methodology expanded with innovative insights to perform business and resource planning alignment.

A CBM is a model of a business including a plurality of non-overlapping business components representing a target state of the business, with each component being a group of cohesive business activities; preferably, the CBM includes the following elements: (i) Business Components element; (ii) Business Competency element; and/or (iii) Business Service element and/or (iv) Business Activity element.

The CBM may include a heat map. A heat map is an outcome of an assessment over the current state of an industry where the skills and capabilities for a particular company are color coded, such as Low, Medium & High were High are capabilities (capability=skill+experience/level) needed for the company to be a leader in the market. In one embodiment, a heat map is a way of visualizing the gaps and key strong areas, an output of applying the embodiments described herein.

A CBM is a technique to model and analyze an enterprise. It is a logical representation or map of business components or "building blocks". The CBM can be used to analyze the alignment of enterprise strategy with the organization's capabilities and investments, identify redundant or overlapping business capabilities, analyze sourcing options for the different components (buy or build), prioritizing transformation options and can be used to create a unified roadmap after mergers or acquisitions.

Figure 1:
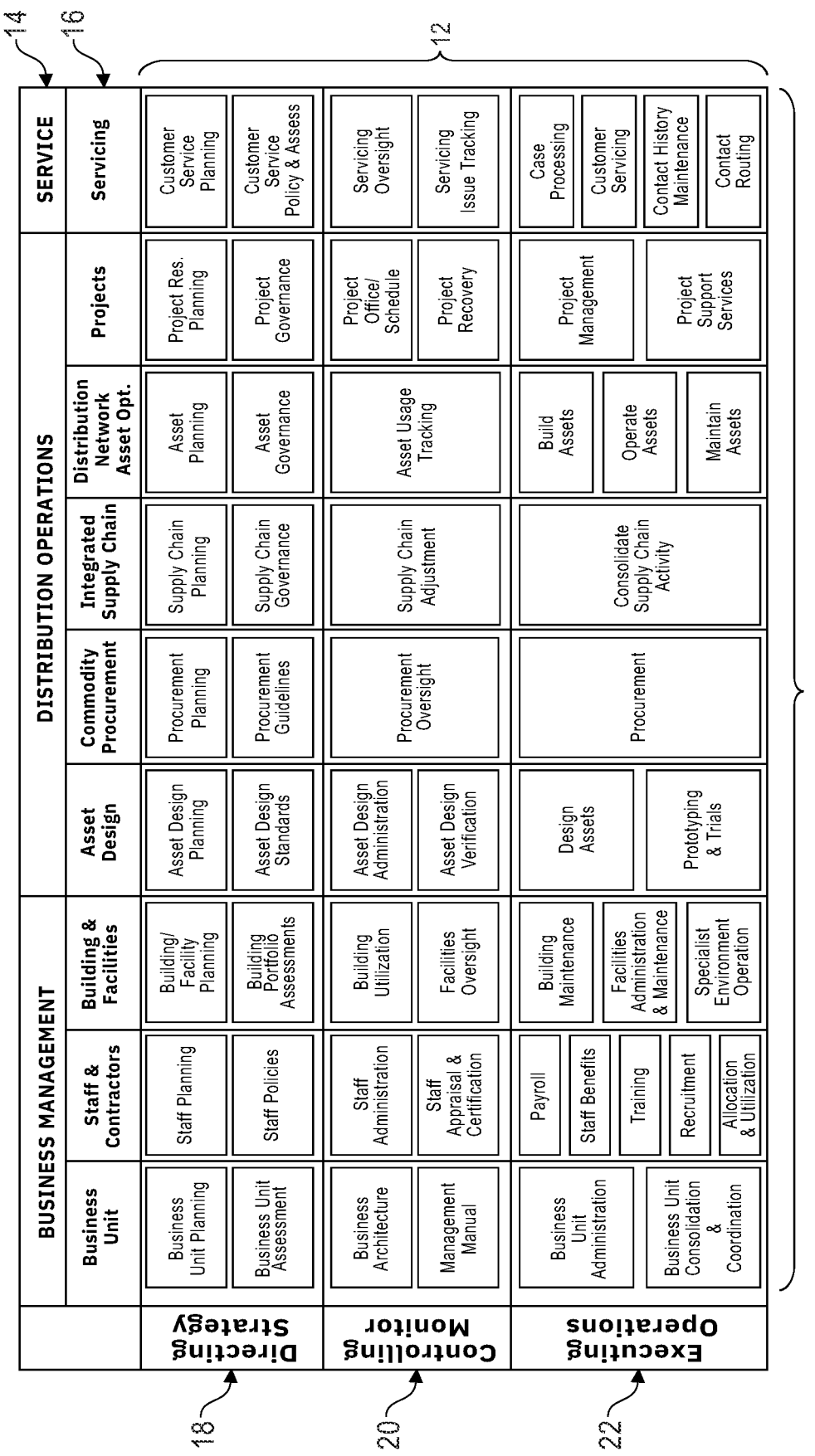
FIG. 1 shows a CBM Heat Map.

Reference is made to FIG. 1, which shows a CBM Heat Map 10 in tabular form. CBM Heat Map 10 is a representation of Business Components 12 grouped into major categories of business competencies 14. The major business competencies 14 are grouped in sub-categories 16. The variable number of categories are designed to cover various types of business activity in every industry. Components 12, which are the main body of the CBM map 10 are grouped into three accountability levels, such as directing/strategy 18, controlling/monitor 20 and executing/operations 22. The directing/strategy level 18 represents all those business components 12 in the business that set the overall strategy and direction for the business. The controlling/monitor level 20 represents all those business components 12 in the business that translate those plans into actions, in addition to managing the day-to-day running of those activities. The executing/operations level 22 contains the business components 12 that actually execute the detailed activities and plans of the business.

A business component 12 is the basic building block of an organization. It is a cohesive group of business activities supported by appropriate processes, applications, infrastructure and metrics. Business components 12 are non-overlapping partitions of business activity, that is, components must have boundaries for their separate cohesive groups of business activities that are simultaneously coincident with respect to a) functional purpose, b) organizational role and authority, c) skill levels required, and d) operational and technical needs. Each business component 12 operates by calling and offering business services. The specialization and expertise of a business component 12 is encapsulated as far as possible. A business component 12 works under a managing concept, which is responsible for each instance of the component over the lifetime of the instance. Often, and preferably, a business component 12 defines a boundary with respect to other components that enables the component to be outsourced with little or no disruption of the business.

FIG. 1 shows certain components 12 being highlighted as High, Medium and Low. The highlighted components 12 that are highlighted as High are "hot" components, which refers to capabilities on which the company needs to be a leader. Medium refers to capabilities on which the company needs to be at par with the competition. Low refers to capabilities on which the company does not need to be at par with the competition or capabilities that are being phased out. Due to the existence of "hot" components 12, the CBM map 10 is considered a "Heat Map". A Heat map is defined herein a set of data identifying at least one critical business component in a CBM, without regard to: (i) whether the heat map assigns a priority value to all components; (ii) the number of possible priority values used in the heat map; and/or (iii) the criteria and/or manner by which critical components are selected.

In some embodiments, the system and method aligns skill and business direct mapping to overview current business health and project future business movement with impact cost from a resource perspective. In some embodiments, the method and system continuously aligns business to resource needs by optimizing the existing individual skills to the right business area. In some embodiments, the method and system allows a company to identify the right time and skill area to invest. In some embodiments, the method and system provides the ability to forecast and get insights to determine if is too late to reskill to remain competitive. In some embodiments, the method and system determines how a company can absorb/combine with another company and still be competitive while not creating skill duplication.

A component business model methodology is a method for enterprise component modelling that is used to perform business analysis, business transformation and assess the state and performance of a business towards its industry state, crossing strategy, execution, and maintenance. Typically, recruiting and human resource departments are attached to a company but there is no clear association between the current state of the business, the impact of business strategies and the skills of the current work force. In some embodiments, the method and system adds a new assessment lens and risk impact to the component business methodology model driven by the trio of skills, business needs and performance for the assessment of business performance and position towards industry emerging trends and robustness of a tactical and strategic roadmap.

Figure 2:
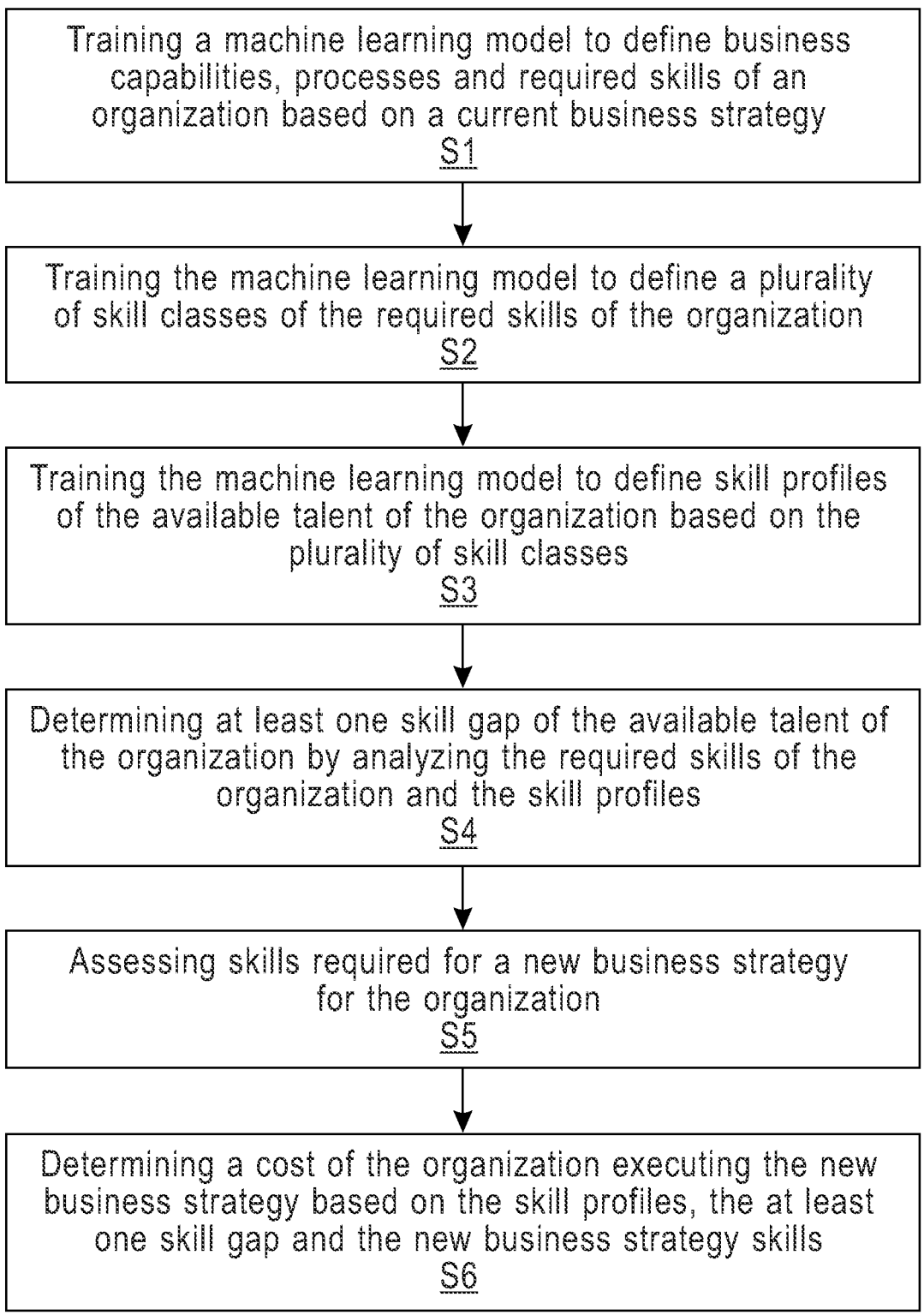
FIG. 2 is a flow diagram of one embodiment of the method disclosed in this specification.

In one embodiment, the method and system creates an enterprise view of skills required for keeping the enterprise vital to changing markets and technology trends and keeping up with the competition. FIG. 2 is a flow diagram of one embodiment of a method for generating a model for evaluating organizational skills to determine cost of entering a new market, using cognitive computing, by a processor device. The method of FIG. 2 includes: step S1 of training a machine learning model to define business capabilities, processes and required skills of an organization based on a current business strategy using a cognitive computing processor device; step S2 of training the machine learning model to define a plurality of skill classes of the required skills of the organization using the cognitive computing processor device; step S3 of training the machine learning model to define skill profiles of the available talent of the organization based on the plurality of skill classes using the cognitive computing processor device; step S4 of determining, using the trained machine learning model, at least one skill gap of the available talent of the organization by analyzing the required skills of the organization and the skill profiles, using the cognitive computing processor device; step S5 of assessing skills required for a new business strategy for the organization, using the cognitive computing processor device; and step S6 of determining a cost of the organization executing the new business strategy based on the skill profiles, the at least one skill gap and the new business strategy skills, using the cognitive computing processor device.

In some embodiments, step S1 of training a machine learning model to define business capabilities and processes and required skills in an organization may include training the machine learning model to link of core business capabilities and processes to required skills and distribution of skill maturity levels of the talent pool. In some embodiments, this is achieved by the machine learning model being trained on market and technology evolution factors as well as business domain complexity factors.

In some embodiments, step of S2 of training a machine learning model to define a plurality of skill classes may include determining required ratio of skills in context of three technology horizons to keep the organization competitive in a changing landscape. In some embodiments, the machine learning model is trained as a multi-class classifier, for example a softmax regression. In one embodiment, the three technology horizon classifiers are skill expertise, cost and quality features categories. In some embodiments, the multi-class classifier machine learning model recommends required ratios of the three technology horizons. In some embodiments, the machine learning model is also leveraged to suggest skill ratios required for each horizon distribution of the three technology horizons.

In some embodiments, step S3 of training the machine learning model to define skills profiles may include a person skill profiling algorithm for auto tagging of users with skills based on multi-layered weighted regressor model. In some embodiments, the regressor model is optimized with Adam. Adam is an optimization algorithm that can be used instead of the classical stochastic gradient descent procedure to update network weights iteratively based in training data. Adam is an adaptive learning rate optimization algorithm that's been designed. specifically for training deep neural networks. In some embodiments, the regressor model is optimized with key skill measurement features such as recognized subject matter expertise (SME), successful initiative executions and social presence.

In some embodiments, step S4 of determining, using the trained machine learning model, at least one skill gap by analyzing skill requirements of the organization, skill profiles and available talent in organization, using the cognitive computing processor device, includes performing gap analysis to determine gaps between the defined skills profiles determined by the profiling algorithm and the defined business capabilities, processes and required skills. In some embodiments, the gap analysis forms the basis for the talent management function in the organization. In some embodiments, automated gap analysis also provides on demand simulation capability to continuously monitor and improvise talent management plan.

In some embodiments, step S5 of assessing skills required for a new business strategy for the organization may include one or more of assessing a changing marketplace and changing technology trends.

In some embodiments, the method and system provides the capability to quantitatively evaluate cost and fitness of starting a new business strategy versus the return in investment (ROI). In one embodiment, the method and system can assess evolution over time of the organization's capabilities with periodic snapshots in the context of changing markets to enable the organization to be agile and react quickly to changing market needs.

In one embodiment, the machine learning model is trained to forecast horizon ratios. In one embodiment, the machine learning model performs task profiling for optimum horizon focus based on Horizon factors H1: Market/Domain Evolution speed factor, H2: Technology evolution speed factor and H3: Domain Complexity weightage. In one embodiment, the machine learning model suggests the most appropriate horizon ratios required for each CBM component.

In one embodiment, for each component of the CBM map 10 we have the following input features:
1. Market/Domain Evolution: —Process«APQC CBM mapped process»—Benchmark«CBM benchmark».
2. Domain Complexity: —Market/Domain Evolution speed factor«calculate based how fast emerging Industry force is adopted»—Domain Complexity«assume available»
3. Technology evolution factor: —Technology evolution factor«calculate based on how fast emerging tech is adopted»—Cost/Revenue«assume available».

In one embodiment, for each component of the CBM map 10 we have the following input features:
Horizon—«available from model 1.1.»
Horizon % —«available from model 1.1.»
Skill«Talent skill taxonomy»
Expertise needed«CBM+Talent skill taxonomy»
Competencies map needed«assume available»
Speed of execution«assume available»
Avg Cost«assume available»
Risk level«assume available»
Complexity«assume available»

In one embodiment, the machine learning model is trained to forecast sparse task profiling for optimum skill levels. In one embodiment, the machine learning model, trained as a multi-class classifier, takes in as features categories from a horizon distribution of {H1 Expert (Exp) Cost, speed and quality [30%], H2 Thought Leaders (TLs) Cost, speed and quality [50%], H3 (Average) Avg Cost, speed and quality [20%]}. In one embodiment, the machine learning model suggests the most appropriate skill ratios required for each Horizon distribution. For example, CBM component Maintain Assets of heat map 10 may be: H1-50% [TL-10, Exp–30, Avg–60], H2-40% [TL-10, Exp–30, Avg-60], H3-10% [TL-10, Exp–30, Avg–60].

In one embodiment, a framework of enterprise skills creation for decomposed domains is determined. In one embodiment the first step is to determine outside in imperatives by breaking down the CBM components into capabilities and processes already available and is extended to skills required for each one. The second step is to measure inside out skill and expertise evaluation by tagging users with skills based on recognized SME, successful initiative executions, social presence and other known sources for skill tagging.

Figure 3:
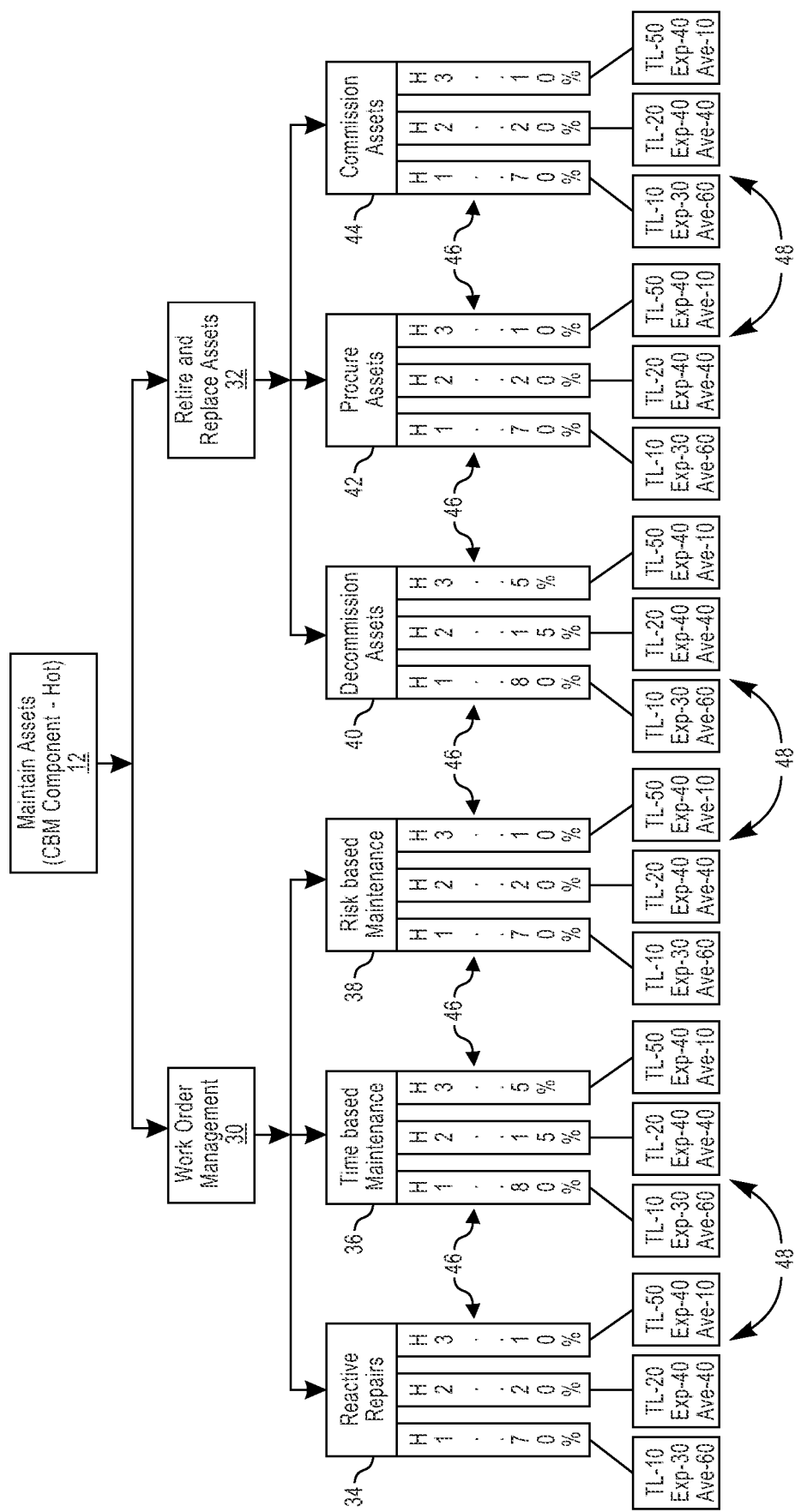
FIG. 3 is a chart showing the Maintain Assets CBM component.

FIG. 3 is a chart showing the Maintain Assets CBM component 12 broken down into capabilities and processes. In some embodiments, the machine learning model and algorithms disclosed herein are used to assess the level of skill and expertise/level distribution need for each component. The machine learning model refines the ratios of distribution need based on task profiling. FIG. 3 is a snapshot, or exemplification of FIG. 1, but zooming into one component, that is classified as Hot (an area of much interest for the company). The component is broken down further to capabilities and processes and decomposed further up to the skill distribution. The Maintain Assets component is broken into sub-components Work Order Management 30 and Retire and Replace Assets 32. Work Order Management 30 is further broken into sub-sub-components Reactive Repairs 34, Time based Maintenance 36 and Risk based Maintenance 38. Retire and Replace Assets 32 is further broken into sub-sub-components Decommission Assets 40, Procure Assets 42 and Commission Assets 44. In some embodiments, a default skill ratio for hot components may be set as H1 50%, H2 20% and H3 30% and the default expertise ratio is H1—[TL-10, Exp-20, Avg-70], H2—[TL-20, Exp–30, Avg—50], H3—[TL-50, Exp–30, Avg–20]. The machine learning model refines these ratios based on task profiling. In the example shown in FIG. 3, the horizon skill ratios H1, H2 and H3 ratios for each sub-sub-component are shown in Horizon ratio prongs 46 and the expertise ratios for each sub-sub-component are shown in expertise blocks 48.

In some embodiments, FIG. 3 shows a company's business using the disclosed algorithms to determine for each component of their business what should be the distribution of skill for and expertise for the three horizons of strategic action. The horizons refer to Horizon 1 (H1)—immediate action strategy in-between 0-2 years, Horizon 2 (H2) in-between 3-5 years, Horizon 3 (H #) in-between 5-10 years. This models helps the company assess the cost of the skill, the training needs, run forwards and backwards propagation models for simulating resource shift or assessing if they are not already too late to enter into a new emerging technology market.

Figure 4A:
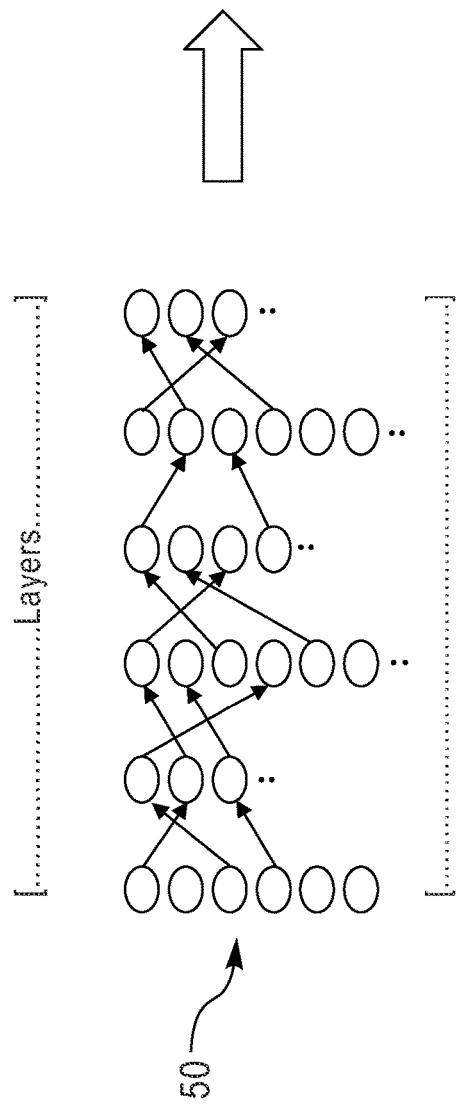
FIG. 4A is diagram showing the relationship of the layers for horizons.
Figure 4B:
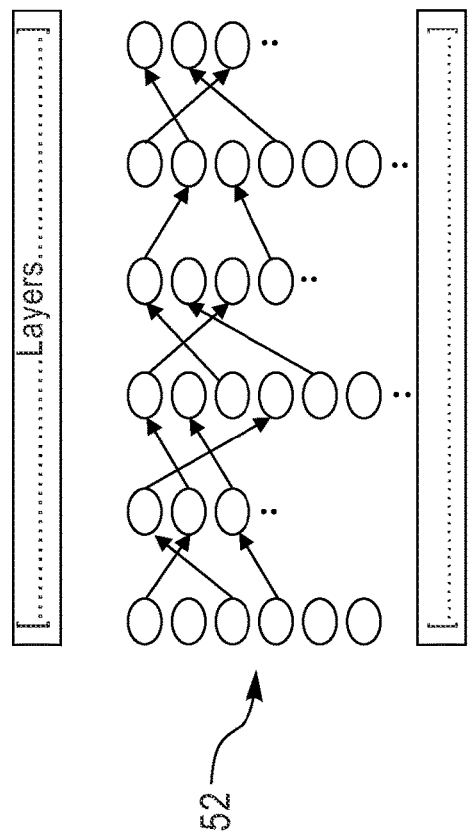
FIG. 4B is diagram showing the relationship of the layers for expertise ratios.

FIG. 4A is a diagram showing the relationship of the machine learning algorithm neural network layers 50 for horizons H1, H2 and H3. In this example, the skill ratios are H1 [30%], H2 [50%], H3 [20%]. FIG. 4A describes the neural network of the machine learning model that outputs for each component the H1-H3 distribution ingesting features as: market evolution, domain complexity and technology to forecast the % of H1-H3 distribution. The H1-H3 distribution helps assess the complexity and investment for that specific component and is analyzed back towards the level of business focus associated in FIG. 1—H, M, L FIG. 4B is a diagram showing the relationship of the machine learning algorithm neural network layers 52 for expertise ratios TL, Exp and Avg. In this example, the ratios are TL [20%], Exp [65%], Avg [15%]. FIG. 4B describes the neural network of the machine learning model that outputs for reach component the skill expertise distribution ingesting features as: horizon from Model 1 FIG. 4A, skills, expertise, cost . . . from the left side. This machine learning model helps to determine the type and amount of skill and expertise distribution for each component to be realized. The neural network compares the inside and outside view of the market and as well to quantitatively evaluate cost/fitness of starting a new strategy versus ROI I.e., a company wants to shift to cloud or quantum however they do not have the resources to quickly shift and acquiring the necessary people and skills is longer than the new domain benefits.

Figure 5:
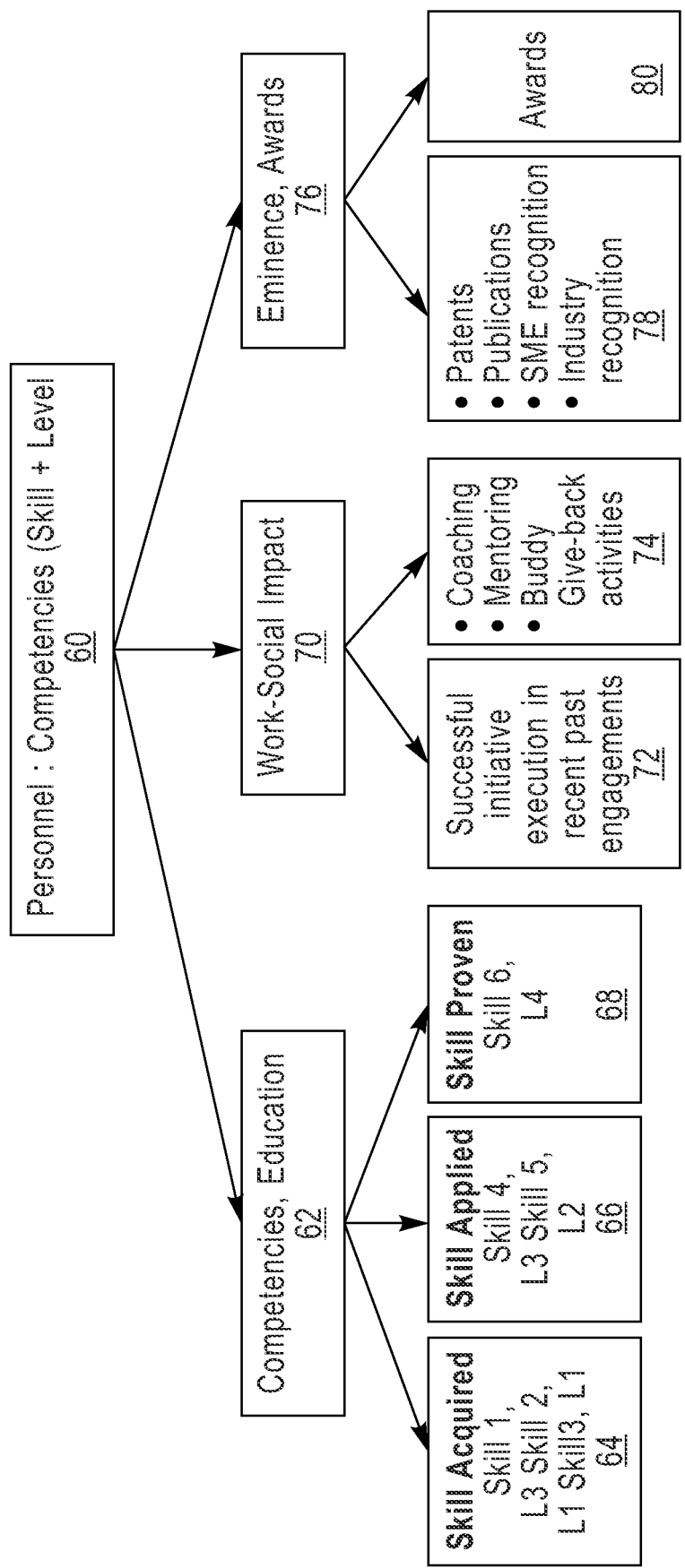
FIG. 5 is a chart showing personnel competencies of skill+level.

FIG. 5 is a chart showing personnel competencies of skill+level 60. The machine learning model determines the overall skill level into TL, Exp or Avg based on acquired, applied and proven skills and social recognition. FIG. 5 describes the neural network of the machine learning model that outputs for each evaluated individual the gap analysis and the overall skill level classification TL, Exp or Avg based on the Acquired, Applied, Proven Skills and Social recognition of peers. Different companies may value the distribution of these skills in a different % so the model can calibrate to accommodate these preferences.

In one embodiment, the machine learning model determines personnel skill levels using a skill profiling algorithm. In one embodiment, FIG. 5 shows a multi-layered weighted regressor model that may be optimized with Adam. In one embodiment, the skill profiling algorithm a layer 1 of 60%, a layer 2 of 25% and a layer 3 of 15%, where the layers are defines as:
   Layer 1 is Competencies, Education 62. Competencies includes the current domain of acquired skill and levels 64 of a person, applied skills 66 and the latest proven skills 68 of the individual in recent-past engagement. Education is relevant to the position, for example education level vs education level required;
   Layer 2 is Work-Social Impact 70, which includes Successful initiative executions in recent past engagements 72 and indicator presence features 74 of coaching, mentoring, buddy, and give-back activities;
   Layer 3 is Eminence-Awards 76 that includes patents, publications, SME recognition and industry recognition 78, and Awards 80, including recent past awards.

In one embodiment, model layers weight percentages can be adjusted for any use case scenario or industry scenarios. It should be noted that not all industries have all these layers.

For individuals that are reconverted, upskilled, new hires or prospects in hiring process, the weighted model helps calibrate and perform gap analysis as it will adjust the features based on relevance. As each person can be assessed versus a H1 and role, this model in conjecture with the H1-H3 expertise calibration can be used for forecasting and force-readjustment scenarios on a continuous or simulation bases, having the ability to do time-series measurements and trace individual skill progression in time. In one embodiment, an R-square mean function will be computed to test the model accuracy. Model outcome will be a skill grade for personnel for role distribution.

In one embodiment, the machine learning model can be also used to assess new individuals or prospects from the market and perform gap analysis. For individuals that do not have all features or are new talent/prospects (potential personnel) the model will add a complementary weight for calibration.

In one embodiment, the skill profiling algorithm grades personnel skill levels for specific role. In one embodiment, the neural network of the machine learning model can ingest both an internal profile or an external one and come with the fitness gap analysis.

In one example, the gap analysis attained when matching a potential talent resource either internal or external of the company to a specific role of interest for the Company could have the following results:
   Layer 1-60% [35% total of 65%=21%]
      Competencies—{40%}
      Applied Skills—{100%}
      Education—{50%}
   Layer 2-25% [100% total of 25%=25%]
      Successful initiative executions—{100%}
      Work social indicator presence features—{100%}
         Layer 3-15% [0 total of 15%=0%]
   Layer 3-15% [0 total of 15%=0%]
      Eminence—{100%}
      Awards—{100%}

In some embodiments, these results are an example of the step of determining, using the trained machine learning model, at least one skill gap of the available talent of the organization by analyzing the required skills of the organization and the skill profiles, using the cognitive computing processor device.

Referring back to FIG. 1, in one example, for the major business competency sub-category 16 of Integrated Supply Chain, the machine learning model determines the skill ratios of the business components 12 in the directing/strategy accountability level 18 to be thought leaders 2%, experts 5%, operations 90% and misc. 3%. In this example, the machine learning model determines the skill ratios of the business components 12 in the controlling/monitor accountability level 20 to be thought leaders 9%, experts 31%, operations 51% and misc. 9%. In this example, the machine learning model determines the skill ratios of the business components 12 in the executing/operations accountability level 22 to be thought leaders 1%, experts 29%, operations 61% and misc. 9%.

The skill ratios are basically showing what is the distribution of skill for a given component. In some embodiments, this is used to assess various scenarios such as: the company can visualize the necessary skill and experience needed to prioritize a new business component or domain; the company can visualize and assess different levels or risk and cost based on the skill and experience distribution; the company can run several layers of simulation of resource shifts, Black Swan events, absorbing new companies or opening new lines of business.

In one aspect, some embodiments are a top down methodology, starting from the high-level business needs and strategic business focus and what is needed to achieve it, or when the company show depreciated it and moved on. In another aspect, some embodiments are a bottom up methodology, assuming the company made a move and either wants to shift resources or open new portions or assess potential risks to help qualify the skills and the gaps to make these movement happen.

Figure 6:
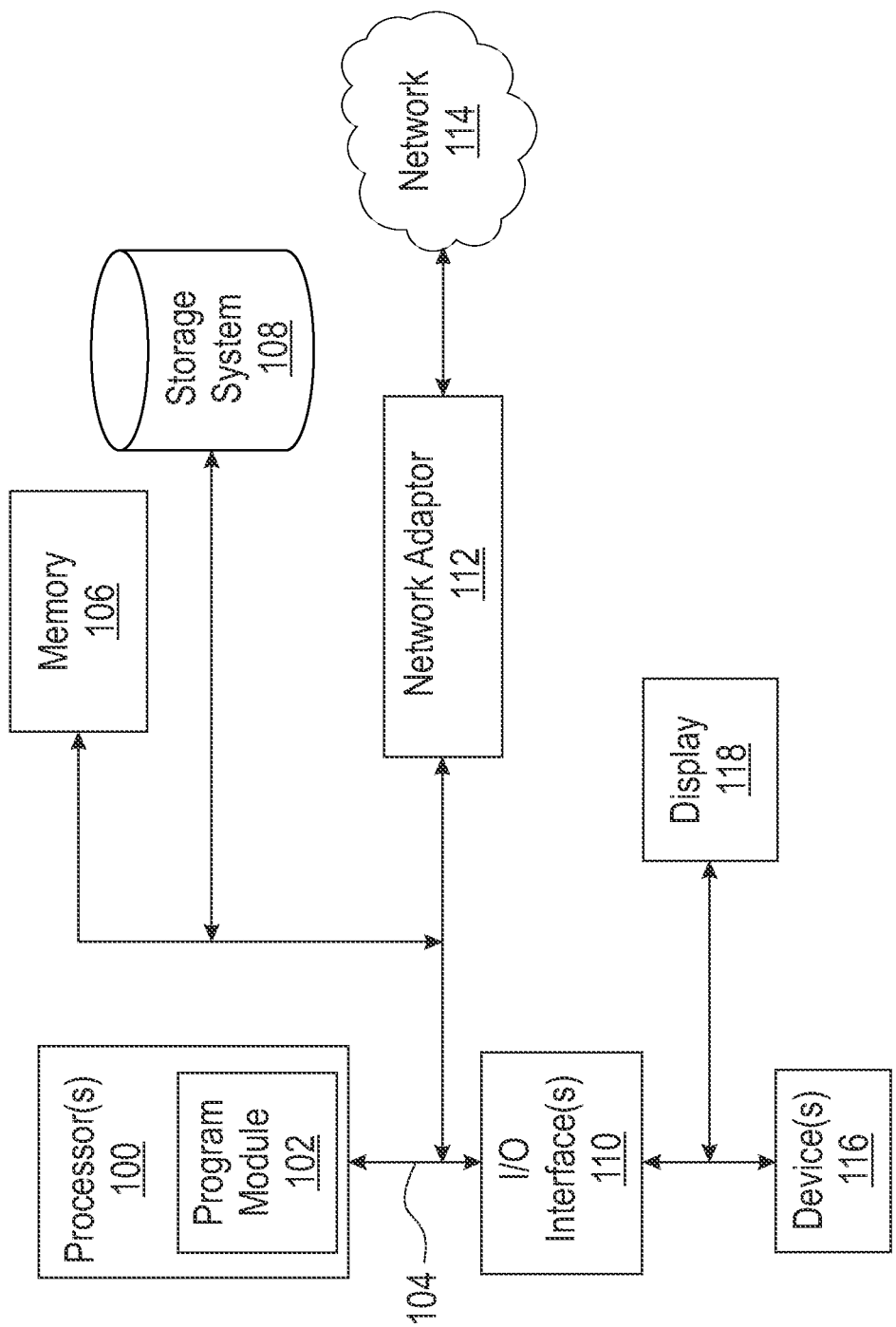
FIG. 6 is a block diagram of an exemplary computing system suitable for implementation of the embodiments of the invention disclosed in this specification.

FIG. 6 illustrates a schematic of an example computer or processing system that may implement the method for generating a model for evaluating organizational skills to determine cost of entering a new market using cognitive computing in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processors 100 may include a program module 102 that performs the methods described herein. The module 102 may be programmed into the integrated circuits of the processor 100, or loaded from memory 106, storage device 108, or network 114 or combinations thereof. In some embodiments, the processors 100 may form a cognitive computing system, such as IBM Watson and the program module 102 may include a machine learning model that performs the methods described herein.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A method for training a machine learning neural network for determining gaps in skills for entering a new market using cognitive computing, comprising:
   creating a first data set defining required skills of an organization from a logical representation of a component business model based on a current business strategy;
   creating a second data set linking core business capabilities and processes to the required skills and distribution of skill maturity levels from the logical representation of a component business model;
   training a machine learning neural network on the first and second data sets to define current skills of an organization based on the current business strategy using a cognitive computing processor device;
   determining a required ratio of skills of three technology horizons to define a plurality of skill classes of the required skills of the organization using the cognitive computing processor device;
   training the machine learning neural network on the required ratio of skills to define current skill profiles of the organization based on the plurality of skill classes using the cognitive computing processor device;
   training the machine learning neural network to determine at least one first skill gap between the required skills of the organization and the current skill profiles, using the cognitive computing processor device;
   creating a third data set comprising skills required for a new business strategy for the organization from a logical representation of a component business model based on the new business strategy, using the cognitive computing processor device; and
   training the machine learning neural network on the third data set to determine at least one second skill gap between the skills required for the new business strategy and the current skill profiles, using the cognitive computing processor device.

2. The method of claim 1, wherein the machine learning neural network is trained to consider market and technology evolution factors as well as business domain complexity factors.

3. The method of claim 1, wherein the machine learning neural network is trained as a multi-class classifier.

4. The method of claim 3, wherein the multi-class classifier machine learning neural network is trained to suggest skill ratios required for each horizon distribution of the three technology horizons.

5. The method of claim 1, wherein training the machine learning neural network to define current skills profiles comprises using a person skill profiling algorithm for auto tagging of users with skills based on a multi-layered weighted regressor neural network.

6. The method of claim 5, wherein determining, using the trained machine learning neural network, at least one first skill gap comprises performing gap analysis to determine gaps between the defined skills profiles determined by the profiling algorithm and the defined business capabilities, processes and required skills.

7. A computer system for training a machine learning neural network for determining gaps in skills for entering a new market using cognitive computing, comprising:
   one or more computer processors;
   one or more non-transitory computer-readable storage media;
   program instructions, stored on the one or more non-transitory computer-readable storage media, which when implemented by the one or more processors, cause the computer system to perform the steps of:
   creating a first data set defining required skills of an organization from a logical representation of a component business model based on a current business strategy;
   creating a second data set linking core business capabilities and processes to the required skills and distribution of skill maturity levels from the logical representation of a component business model;
   training a machine learning neural network on the first and second data sets to define current skills of an organization based on the current business strategy using a cognitive computing processor device;
   determining a required ratio of skills of three technology horizons to define a plurality of skill classes of the required skills of the organization using the cognitive computing processor device;
   training the machine learning neural network on the required ratio of skills to define current skill profiles of the organization based on the plurality of skill classes using the cognitive computing processor device;
   training the machine learning neural network to determine at least one first skill gap between the required skills of the organization and the current skill profiles, using the cognitive computing processor device;
   creating a third data set comprising skills required for a new business strategy for the organization from a logical representation of a component business model based on the new business strategy, using the cognitive computing processor device; and
   training the machine learning neural network on the third data set to determine at least one second skill gap between the skills required for the new business strategy and the current skill profiles, using the cognitive computing processor device.

8. The computer system of claim 7, wherein the machine learning neural network is trained to consider market and technology evolution factors as well as business domain complexity factors.

9. The computer system of claim 7, wherein the machine learning neural network is trained as a multi-class classifier.

10. The computer system of claim 9, wherein the multi-class classifier machine learning neural network is trained to suggest skill ratios required for each horizon distribution of the three technology horizons.

11. The computer system of claim 7, wherein training the machine learning neural network to define skills profiles comprises using a person skill profiling algorithm for auto tagging of users with skills based on a multi-layered weighted regressor neural network.

12. The computer system of claim 7, wherein determining, using the trained machine learning neural network, at least one first skill gap comprises performing gap analysis to determine gaps between the defined skills profiles determined by the profiling algorithm and the defined business capabilities, processes and required skills.

13. A computer program product comprising:
   program instructions on a computer-readable storage medium, where execution of the program instructions using a computer causes the computer to perform a method for training a machine learning neural network for determining gaps in skills for entering a new market using cognitive computing, comprising:

creating a first data set defining required skills of an organization from a logical representation of a component business model based on a current business strategy;

creating a second data set linking core business capabilities and processes to the required skills and distribution of skill maturity levels from the logical representation of a component business model;

training a machine learning neural network on the first and second data sets to define current skills of an organization based on the current business strategy using a cognitive computing processor device;

determining a required ratio of skills of three technology horizons to define a plurality of skill classes of the required skills of the organization using the cognitive computing processor device;

training the machine learning neural network on the required ratio of skills to define current skill profiles of the organization based on the plurality of skill classes using the cognitive computing processor device;

training the machine learning neural network to determine at least one first skill gap between the required skills of the organization and the current skill profiles, using the cognitive computing processor device;

creating a third data set comprising skills required for a new business strategy for the organization from a logical representation of a component business model based on the new business strategy, using the cognitive computing processor device; and training the machine learning neural network on the third data set to determine at least one second skill gap between the skills required for the new business strategy and the current skill profiles, using the cognitive computing processor device.

14. The computer program product of claim 13, wherein the machine learning neural network is trained to consider market and technology evolution factors as well as business domain complexity factors and wherein the machine learning neural network is trained as a multi-class classifier.

15. The computer program product of claim 14, wherein the multi-class classifier machine learning neural network is trained to suggest skill ratios required for each horizon distribution of the three technology horizons and wherein training the machine learning neural network to define current skills profiles comprises using a person skill profiling algorithm for auto tagging of users with skills based on a multi-layered weighted regressor neural network.

16. The computer program product of claim 14, wherein determining, using the trained machine learning neural network, at least one first skill gap comprises performing gap analysis to determine gaps between the defined skills profiles determined by the profiling algorithm and the defined business capabilities, processes and required skills.

* * * * *